US009736178B1

(12) United States Patent
Ashley

(10) Patent No.: US 9,736,178 B1
(45) Date of Patent: *Aug. 15, 2017

(54) SYSTEMS AND METHODS FOR DETECTING SUSPICIOUS INTERNET ADDRESSES

(71) Applicant: Symantec Corporation, Mountain View, CA (US)

(72) Inventor: Peter Ashley, Hopkinton, MA (US)

(73) Assignee: Symantec Corporation, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,775

(22) Filed: Apr. 5, 2016

Related U.S. Application Data

(63) Continuation of application No. 14/324,824, filed on Jul. 7, 2014, now Pat. No. 9,332,022.

(51) Int. Cl.
*H04L 29/06* (2006.01)

(52) U.S. Cl.
CPC ...... *H04L 63/1433* (2013.01); *H04L 63/1441* (2013.01)

(58) Field of Classification Search
CPC .......... H04L 63/1433; H04L 63/1441
USPC ........................................ 726/25
See application file for complete search history.

(56) References Cited

U.S. PATENT DOCUMENTS

| | | | |
|---|---|---|---|
| 7,181,204 B2 | 2/2007 | Alfano et al. | |
| 7,809,795 B1 * | 10/2010 | Cooley | G06Q 10/107 709/200 |
| 8,613,064 B1 * | 12/2013 | Roy | G06F 21/316 380/247 |
| 8,776,196 B1 * | 7/2014 | Oliver | H04L 63/1483 726/11 |
| 9,258,269 B1 | 2/2016 | Ashley | |
| 2007/0124487 A1 | 5/2007 | Yoshimoto et al. | |
| 2007/0180090 A1 | 8/2007 | Fleischman et al. | |

(Continued)

OTHER PUBLICATIONS

Nishant Doshi, et al.; Systems and Methods for Detecting and Preventing Phishing Attacks; U.S. Appl. No. 12/402,863, filed Mar. 12, 2009.

(Continued)

*Primary Examiner* — Michael S McNally
(74) *Attorney, Agent, or Firm* — FisherBroyles LLP

(57) ABSTRACT

The disclosed computer-implemented method for detecting suspicious Internet addresses may include (1) monitoring Internet communications of an entity (e.g., an organization or individual), (2) compiling an Internet-address history for the entity that includes one or more Internet addresses involved in the Internet communications of the entity, (3) detecting, after compiling the Internet-address history for the entity, an additional Internet address that may be used in future Internet communications involving the entity, (4) computing a similarity metric between the additional Internet address and at least one Internet-address in the Internet-address history, (5) determining that the similarity metric indicates that the additional Internet address is suspicious, and (6) performing a security action in response to determining that the similarity metric indicates that the additional Internet address is suspicious. Various other methods, systems, and computer-readable media are also disclosed.

20 Claims, 7 Drawing Sheets

(56) References Cited

U.S. PATENT DOCUMENTS

| | | | |
|---|---|---|---|
| 2007/0271343 A1 | 11/2007 | George et al. | |
| 2011/0219446 A1* | 9/2011 | Ichnowski | H04L 63/1441 726/22 |
| 2012/0084860 A1* | 4/2012 | Cao | H04L 63/1441 726/23 |

OTHER PUBLICATIONS

Oleg Kislyuk, et al.; Systems and Methods for Detecting Suspicious Web Pages; U.S. Appl. No. 12/857,119, filed Aug. 16, 2010.

Michael Hart, et al.; Systems and Methods for Classifying Documents for Data Loss Prevention; U.S. Appl. No. 13/405,293, filed Feb. 25, 2012.

"GOSSiP Frequently Asked Questions", http://sufficiently-advanced.net/faq.html, as accessed on Jan. 26, 2009.

"The GOSSiP Project", http://www.sufficiently-advanced.net/, as accessed on Jan. 26, 2009.

Spamhaus, "The Spamhaus Block List", http://www.spamhaus.org/sbl/index.lasso, as accessed on Jan. 26, 2009.

Cloudmark, "Cloudmark Service and Razor-Agents", http://web.archive.org/web/20090511173343/http://www.cloudmark.com/policies/razor/, as accessed on Jan. 26, 2009.

Bizanga, "Products", http://www.bizanga.com/products/index.php, as accessed on Jan. 26, 2009.

Cisco, "IronPort Anti-Spam—Accurately Protecting Against the Broadest Range of Threats", http://web.archive.org/web/20101216140421/http://ironport.com/products/ironport_antispam.html, as accessed on Jan. 26, 2009.

Peter Ashley; Methods and Systems for Managing Delivery of Email to Local Recipients Using Local Reputations; U.S. Appl. No. 12/411,146, filed Mar. 25, 2009.

Jim Casaburi, et al.; Systems and Methods for Securing Internet Access on Restricted Mobile Platforms; U.S. Appl. No. 13/231,919, filed Sep. 13, 2011.

Michael Hart; Systems and Methods for Transparent Data Loss Prevention Classifications; U.S. Appl. No. 13/633,846, filed Oct. 2, 2012.

Kevin Roundy; Systems and Methods for Using User-Input Information to Identify Computer Security Threats; U.S. Appl. No. 14/033,777, filed Sep. 23, 2013.

Fanglu Guo, et al.; Systems and Methods for Reducing False Positives When Using Event-Correlation Graphs to Detect Attacks on Computing Systems; U.S. Appl. No. 14/031,044, filed Sep. 19, 2013.

Deb Banerjee; Systems and Methods for Enforcing Secure Network Segmentation for Sensitive Workloads; U.S. Appl. No. 13/945,373, filed Jul. 18, 2013.

Anand Kashyap, et al.; Systems and Methods for Protecting Organizations Against Spear Phishing Attacks; U.S. Appl. No. 14/262,422, filed Apr. 25, 2014.

"BrightCloud", http://www.brightcloud.com/, as accessed May 19, 2014, (2004).

"ESET", http://www.eset.com/us/, as accessed May 19, 2014, (2008).

Yadav, Sandeep et al., "Detecting Algorithmically Generated Malicious Domain Names", http://citeseerx.ist.psu.edu/viewdoc/download?doi=10.1.1.221.1167&rep=rep1&type=pdf, as accessed May 19, 2014, IMC'10, Melbourne, Australia, (Nov. 1-3, 2010).

Chong, Christophe et al., "Malicious URL Detection", http://www.cs.berkeley.edu/~jtma/papers/beyondbl-kdd2009.pdf, as accessed May 19, 2014, (2009).

Garera, Sujata et al., "A Framework for Detection and Measurement of Phishing Attacks", http://www.cs.jhu.edu/~sdoshi/index_files/p1-garera.pdf, as accessed May 19, 2014, WORM'07, Alexandria, Virginia, USA, (Nov. 2, 2007).

Cohen, William W., et al., "A Comparison of String Distance Metrics for Name-Matching Tasks", https://www.cs.cmu.edu/~pradeepr/papers/ijcai03.pdf, as accessed May 19, 2014, American Association for Artificial Intelligence, (2003).

Michael Hart, et al.; A System to identify machines infected by Malware Applying Linguistic Analysis; U.S. Appl. No. 14/226,626, filed Mar. 26, 2014.

* cited by examiner

SYSTEMS AND METHODS FOR DETECTING SUSPICIOUS INTERNET ADDRESSES

CROSS REFERENCE TO RELATED APPLICATION

This application is a continuation of U.S. application Ser. No. 14/324,824, filed 7 Jul. 2014, the disclosure of which is incorporated, by this reference, in its entirety.

BACKGROUND

In recent years, malicious organizations have created a variety of sophisticated targeted attacks aimed at high-profile or high-level entities, such as governments, corporations, political organizations, defense contractors, or the like. In many cases, the goal of such targeted attacks is to gain access to highly sensitive or confidential information, such as financial information, defense-related information, and/or intellectual property (e.g., source code), and/or to simply disrupt an entity's operations.

One common technique for executing targeted attacks on organizations is spear phishing. Using this technique, an attacker may impersonate a trusted entity (e.g., a trusted contact or business partner) in electronic communications to a specific individual within an organization. For example, an attacker may impersonate a trusted entity by using an Internet address (such as a web address or an email address) that is similar to (and that may be mistaken for) the trusted entity's Internet address. By impersonating a trusted entity, an attacker may entice an individual to open malicious email attachments, visit malicious web pages that may exploit vulnerabilities in web browser software, or enter sensitive information (e.g., account credentials) into a malicious website that imitates the look and feel of a trusted website. Accordingly, the instant disclosure identifies and addresses a need for systems and methods for detecting suspicious Internet addresses.

SUMMARY

As will be described in greater detail below, the instant disclosure describes various systems and methods for detecting suspicious Internet addresses. In one example, a computer-implemented method for detecting suspicious Internet addresses may include (1) monitoring Internet communications of an entity (such as an organization or an individual), (2) compiling an Internet-address history for the entity that includes one or more Internet addresses involved in the Internet communications of the entity, (3) detecting, after compiling the Internet-address history for the entity, an additional Internet address that may be used in future Internet communications involving the entity, (4) computing a similarity metric between the additional Internet address and at least one Internet-address in the Internet-address history, (5) determining that the similarity metric indicates that the additional Internet address is suspicious, and (6) performing a security action in response to determining that the similarity metric indicates that the additional Internet address is suspicious.

In some embodiments, the step of determining that the similarity metric indicates that the additional Internet address is suspicious may include determining that the similarity metric indicates that the additional Internet address is part of a targeted attack on the entity.

In some embodiments, the step of determining that the similarity metric indicates that the additional Internet address is suspicious may include determining that the similarity metric indicates that a domain-fluxing algorithm generated the additional Internet address.

In some embodiments, the step of computing the similarity metric may include computing a lexical distance between the additional Internet address and at least one Internet-address in the Internet-address history, and the step of determining that the similarity metric indicates that the additional Internet address is suspicious may include determining that the lexical distance is less than a predetermined threshold.

In some embodiments, the entity may be an organization, an individual, a department within an organization, or a computing system.

In some embodiments, the step of detecting the additional Internet address may include detecting the additional Internet address in an inbound Internet communication of the entity, and the step of performing the security action may include blocking the inbound Internet communication and/or informing the entity that the additional Internet address in the inbound Internet communication is suspicious.

In some embodiments, the step of detecting the additional Internet address may include detecting an outbound Internet communication that is transmitted by the entity to the additional Internet address, and the step of performing the security action may include blocking the outbound Internet communication and/or informing the entity that the additional Internet address is suspicious.

In some embodiments, the step of detecting the additional Internet address may include detecting an attempt by the entity to use the additional Internet address, and the step of performing the security action may include blocking the attempt by the entity to use the additional Internet address and/or informing the entity that the additional Internet address is suspicious.

In some embodiments, the additional Internet address and/or at least one Internet-address in the Internet-address history may be an email address, a domain name, or a uniform resource locator.

In some embodiments, the step of compiling the Internet-address history may include recording a frequency at which each Internet address in the Internet-address history is involved in the Internet communications of the entity, and the step of computing the similarity metric may include computing a similarity metric between the additional Internet address and at least one Internet-address in the Internet-address history whose frequency is greater than a predetermined threshold.

In some embodiments, the step of compiling the Internet-address history may include adding, to the Internet-address history, only Internet addresses involved in inbound Internet communications of the entity, and the step of computing the similarity metric may include computing a similarity metric between the additional Internet address and at least one Internet-address in the Internet-address history that was involved in an inbound Internet communication of the entity.

In some embodiments, the step of determining that the similarity metric indicates that the additional Internet address is suspicious may include determining that the additional Internet address is not contained in a database of Internet addresses that are known to be legitimate and/or determining that the additional Internet address is not an Internet address that is involved in Internet communications of a predetermined number of additional entities.

In one embodiment, a system for implementing the above-described method may include (1) a monitoring module, stored in memory, that monitors Internet communications of an entity, (2) a compiling module, stored in memory, that compiles an Internet-address history for the entity that includes one or more Internet addresses involved in the Internet communications of the entity, (3) a detecting module, stored in memory, that detects, after the Internet-address history for the entity is compiled, an additional Internet address that may be used in future Internet communications involving the entity, (4) a similarity module, stored in memory, that computes a similarity metric between the additional Internet address and at least one Internet-address in the Internet-address history, (5) a determining module, stored in memory, that determines that the similarity metric indicates that the additional Internet address is suspicious, (6) a security module, stored in memory, that performs a security action in response to determining that the similarity metric indicates that the additional Internet address is suspicious, and (7) at least one processor that executes the monitoring module, the compiling module, the detecting module, the similarity module, the determining module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) monitor Internet communications of an entity, (2) compile an Internet-address history for the entity that includes one or more Internet addresses involved in the Internet communications of the entity, (3) detect, after the Internet-address history for the entity is compiled, an additional Internet address that may be used in future Internet communications involving the entity, (4) compute a similarity metric between the additional Internet address and at least one Internet-address in the Internet-address history, (5) determine that the similarity metric indicates that the additional Internet address is suspicious, and (6) perform a security action in response to determining that the similarity metric indicates that the additional Internet address is suspicious.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
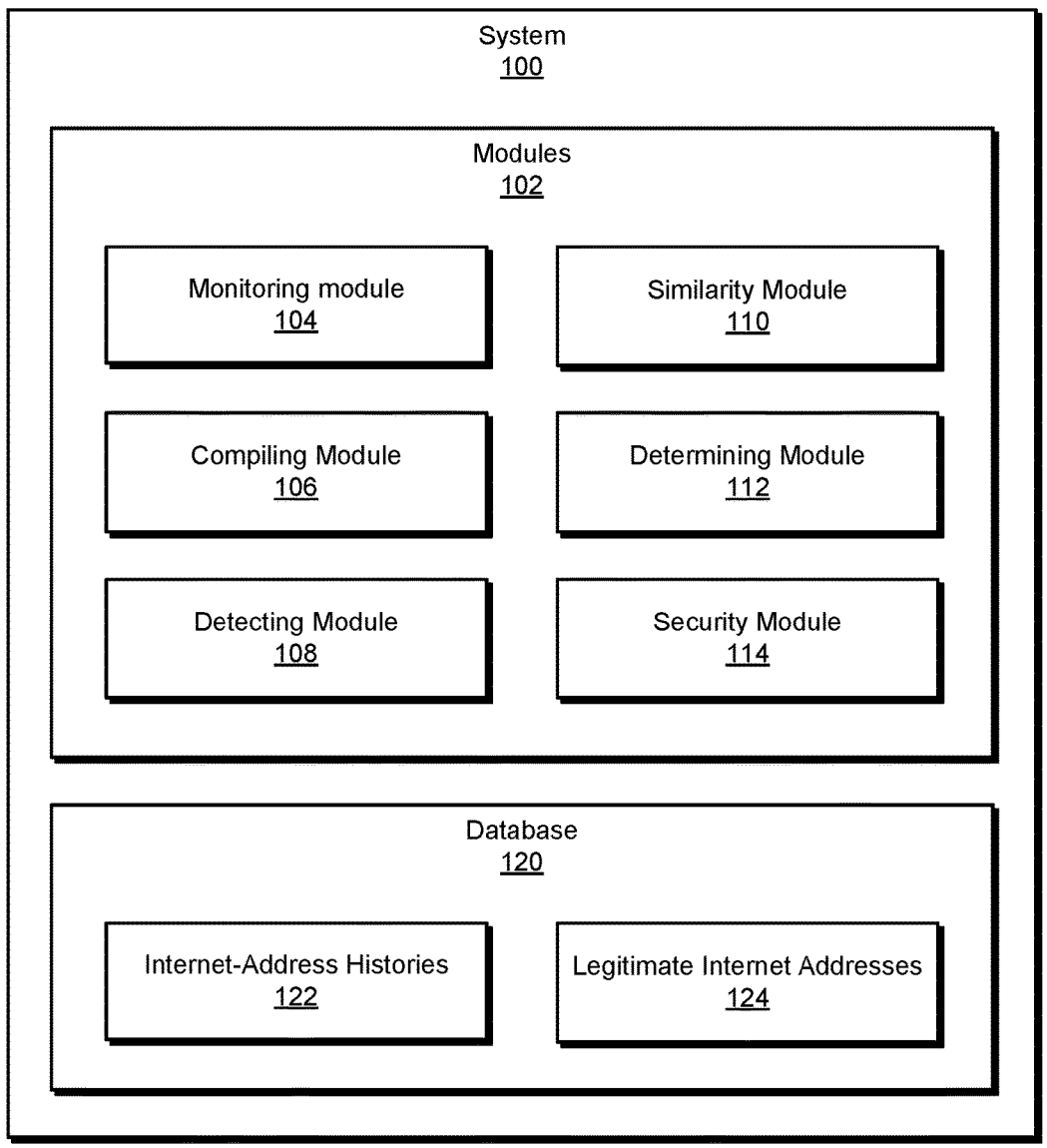
FIG. 1 is a block diagram of an exemplary system for detecting suspicious Internet addresses.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting suspicious Internet addresses. As will be explained in greater detail below, by monitoring the Internet communications of a particular entity (such as an organization), the systems and methods described herein may detect newly encountered Internet addresses that are suspiciously similar to and/or may be mistaken for Internet addresses previously encountered in the Internet communications of the entity and may, as a result, be part of a targeted attack (such as a spear-phishing attack) on the entity. Furthermore, in some examples, by comparing newly encountered Internet addresses to Internet addresses that have been previously encountered in Internet communications of an entity rather than to every Internet address that is known to be legitimate, these systems and methods may detect Internet addresses that may be part of targeted attacks at high true-positive rates and low false-positive rates.

Moreover, by detecting newly encountered Internet addresses that are similar to Internet addresses previously encountered in the Internet communications transmitted from a computing system, the systems and methods disclosed herein may determine that the newly encountered Internet addresses were generated using a domain-fluxing algorithm by a bot network that has infected the computing system. In this way, the systems and methods disclosed herein may detect and/or eliminate bot networks. Embodiments of the instant disclosure may also provide various other advantages and features, as discussed in greater detail below.

Figure 2:
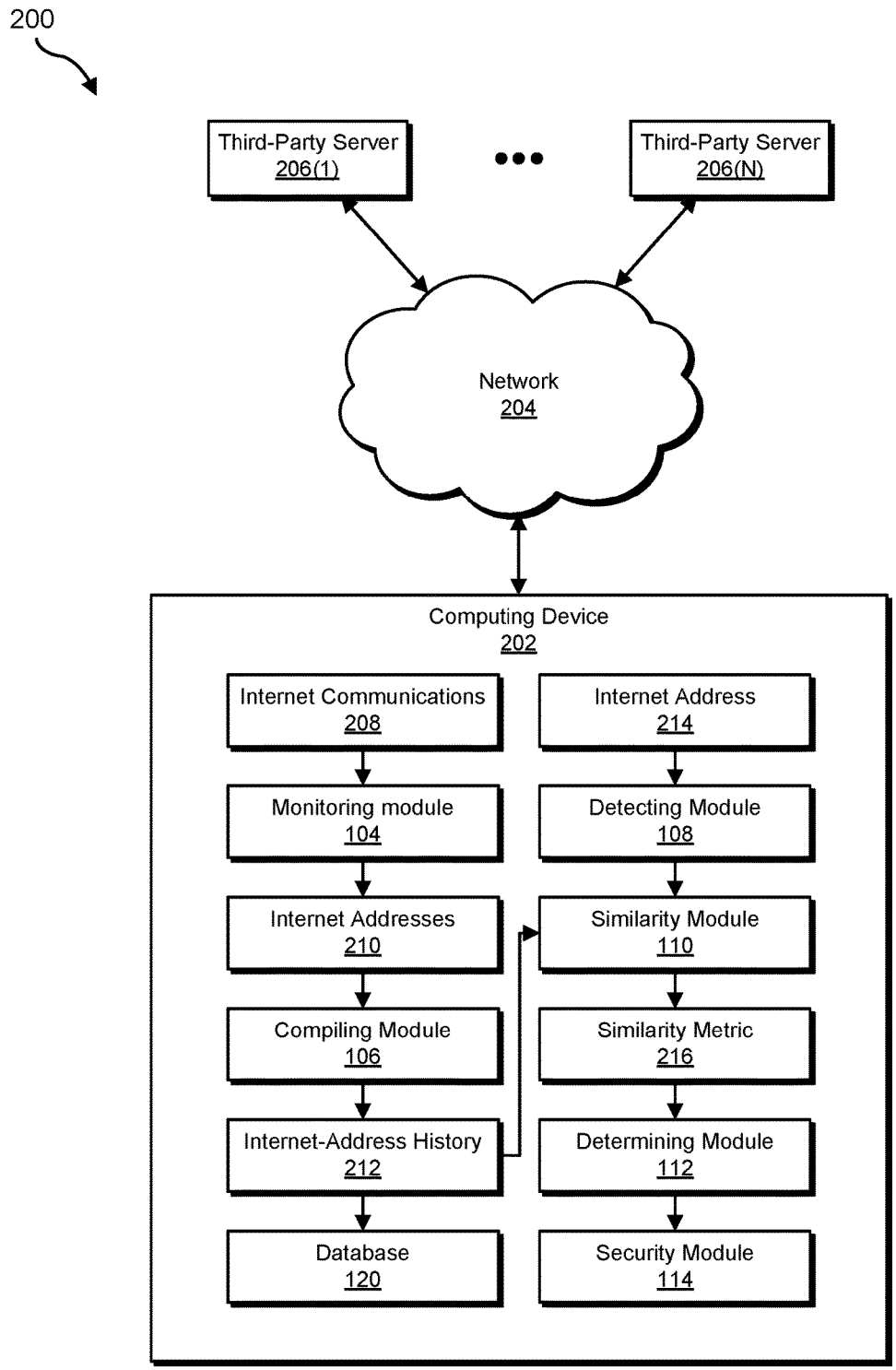
FIG. 2 is a block diagram of an exemplary system for detecting suspicious Internet addresses.
Figure 3:
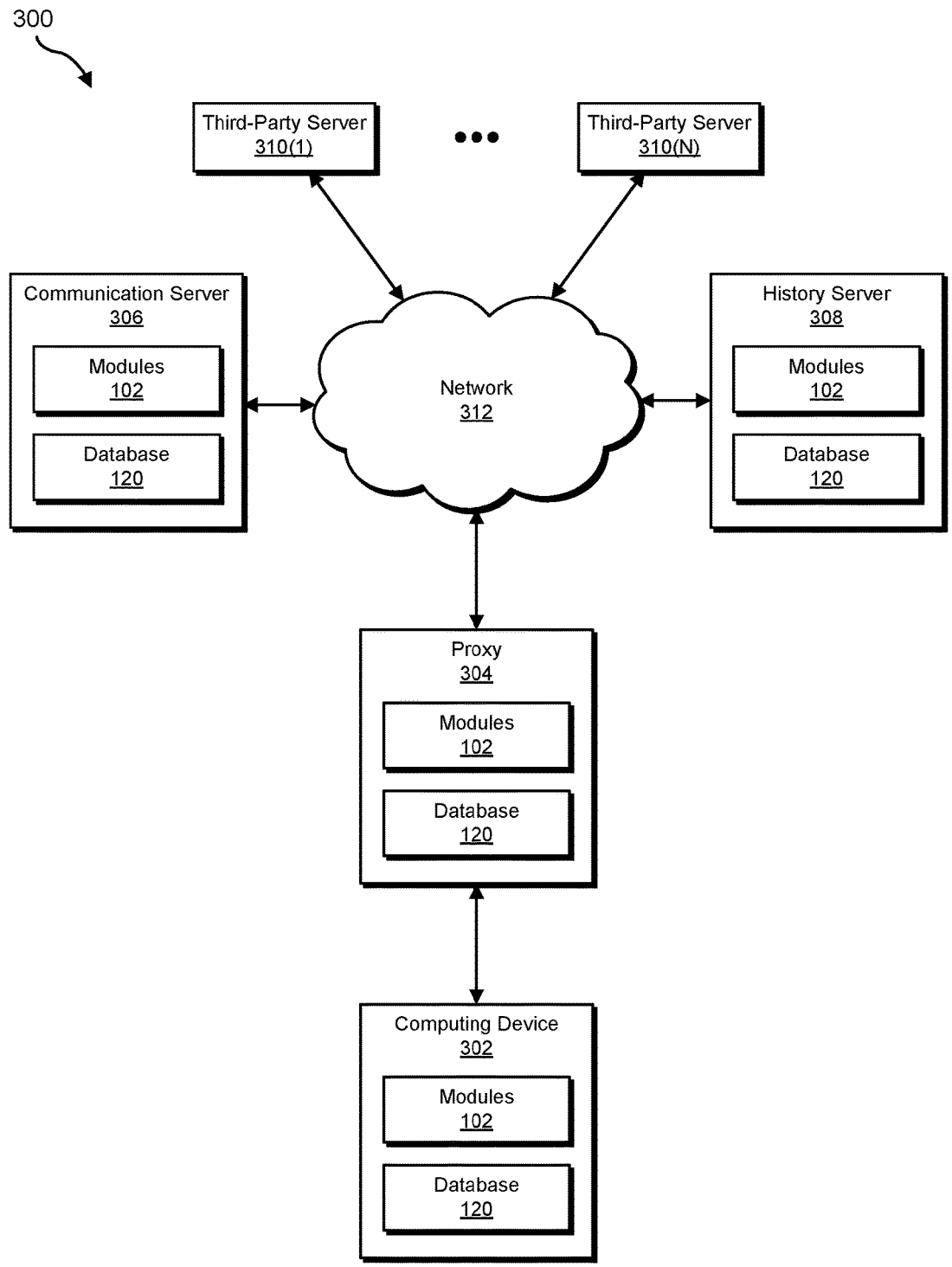
FIG. 3 is a block diagram of an exemplary system for detecting suspicious Internet addresses.

The following will provide, with reference to FIGS. 1-3, detailed descriptions of exemplary systems for detecting suspicious Internet addresses. Detailed descriptions of corresponding computer-implemented methods will also be provided in connection with FIGS. 4 and 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for detecting suspicious Internet addresses. As illustrated in this figure, exemplary system 100 may include one or more modules 102 for performing one or more tasks. For example, and as will be explained in greater detail below, exemplary system 100 may include a monitoring module 104 that monitors Internet communications of an entity. Exemplary system 100 may also include a compiling module 106 that compiles an Internet-address history for the entity that includes one or more Internet addresses involved in the Internet communications of the entity. Exemplary system 100 may further include a detecting module 108 that detects an additional Internet address that may be used in future Internet communications involving the entity.

In addition, and as will be described in greater detail below, exemplary system 100 may include a similarity module 110 that computes a similarity metric between the additional Internet address and at least one Internet-address in the Internet-address history. Exemplary system 100 may also include a determining module 112 that determines that the similarity metric indicates that the additional Internet address is suspicious. Exemplary system 100 may further include a security module 114 that performs a security action in response to determining that the similarity metric indicates that the additional Internet address is suspicious. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIGS. 2 and 3 (e.g., computing device 202, computing device 302, proxy 304, communication server 306, and/or history server 308), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may store information about one or more Internet-address histories (e.g., Internet-address histories 122) and/or information about one or more legitimate Internet addresses (e.g., legitimate Internet addresses 124).

Database 120 may represent portions of a single database or computing device or a plurality of databases or computing devices. For example, database 120 may represent a portion of the devices illustrated in FIGS. 2 and 3 (e.g., computing device 202, computing device 302, proxy 304, communication server 306, and/or history server 308), computing system 610 in FIG. 6, and/or portions of exemplary network architecture 700 in FIG. 7. Alternatively, database 120 in FIG. 1 may represent one or more physically separate devices capable of being accessed by a computing device, such as the devices illustrated in FIGS. 2 and 3 (e.g., computing device 202, computing device 302, proxy 304, communication server 306, and/or history server 308), computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with third-party servers 206 (1)-(N) via a network 204. In one example, computing device 202 may be programmed with one or more of modules 102 and/or may store all or a portion of the data in database 120.

Additionally or alternatively, all or a portion of exemplary system 100 may represent portions of exemplary system 300 in FIG. 3. As shown in FIG. 3, system 300 may include a computing device 302, a proxy 304, a communication server 306, a history server 308, and third-party servers 310 (1)-(N) in communication via a network 312. In various examples, computing device 302, proxy 304, communication server 306, and/or history server 308 may be programmed with one or more of modules 102 and/or may store all or a portion of the data in database 120.

Computing device 202, computing device 302, proxy 304, communication server 306, and history server 308 generally represent any type or form of computing device capable of reading computer-executable instructions. Examples of computing device 202, computing device 302, proxy 304, communication server 306, and history server 308 include, without limitation, laptops, tablets, desktops, servers (e.g., application servers and database servers configured to provide various database services and/or run certain software applications), cellular phones, Personal Digital Assistants (PDAs), multimedia players, embedded systems, wearable devices (e.g., smart watches, smart glasses, etc.), gaming consoles, combinations of one or more of the same, exemplary computing system 610 in FIG. 6, or any other suitable computing device.

Third-party servers 206(1)-(N) and third-party servers 310 (1)-(N) generally represent any type or form of computing device with which an entity may communicate using Internet addresses. Examples of server 206 include, without limitation, third-party web servers or third-party email servers.

Network 204 and network 312 generally represent any medium or architecture capable of facilitating communication or data transfer. Examples of network 204 and network 312 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Network 204 and network 312 may facilitate communication or data transfer using wireless or wired connections. In one embodiment, network 204 may facilitate communication between computing device 202 and third-party servers 206(1)-(N). In at least one embodiment, network 312 may facilitate communication between computing device 302, proxy 304, communication server 306, history server 308, and third-party servers 310 (1)-(N).

In one embodiment, one or more of modules 102 from FIG. 1 may, when executed by at least one processor of computing device 202 in FIG. 2 or computing device 302, proxy 304, communication server 306, and/or history server 308 in FIG. 3, enable computing device 202, computing device 302, proxy 304, communication server 306, and/or history server 308 to detect suspicious Internet addresses. For example, and as will be described in greater detail below, one or more of modules 102 may cause computing device 202 to (1) monitor Internet communications 208 of an organization within which computing device 202 operates, (2) compile Internet-address history 212 for the organization that includes one or more Internet addresses 210 involved in Internet communications 208 of the organization, (3) detect an additional Internet address 214 that may be used in future Internet communications involving the organization, (4) compute a similarity metric 216 between Internet address 214 and at least one Internet-address in Internet-address history 212, (5) determine that similarity metric 216 indicates that Internet address 214 is suspicious, and (6) perform a security action in response to determining that similarity metric 216 indicates that Internet address 214 is suspicious.

Figure 4:
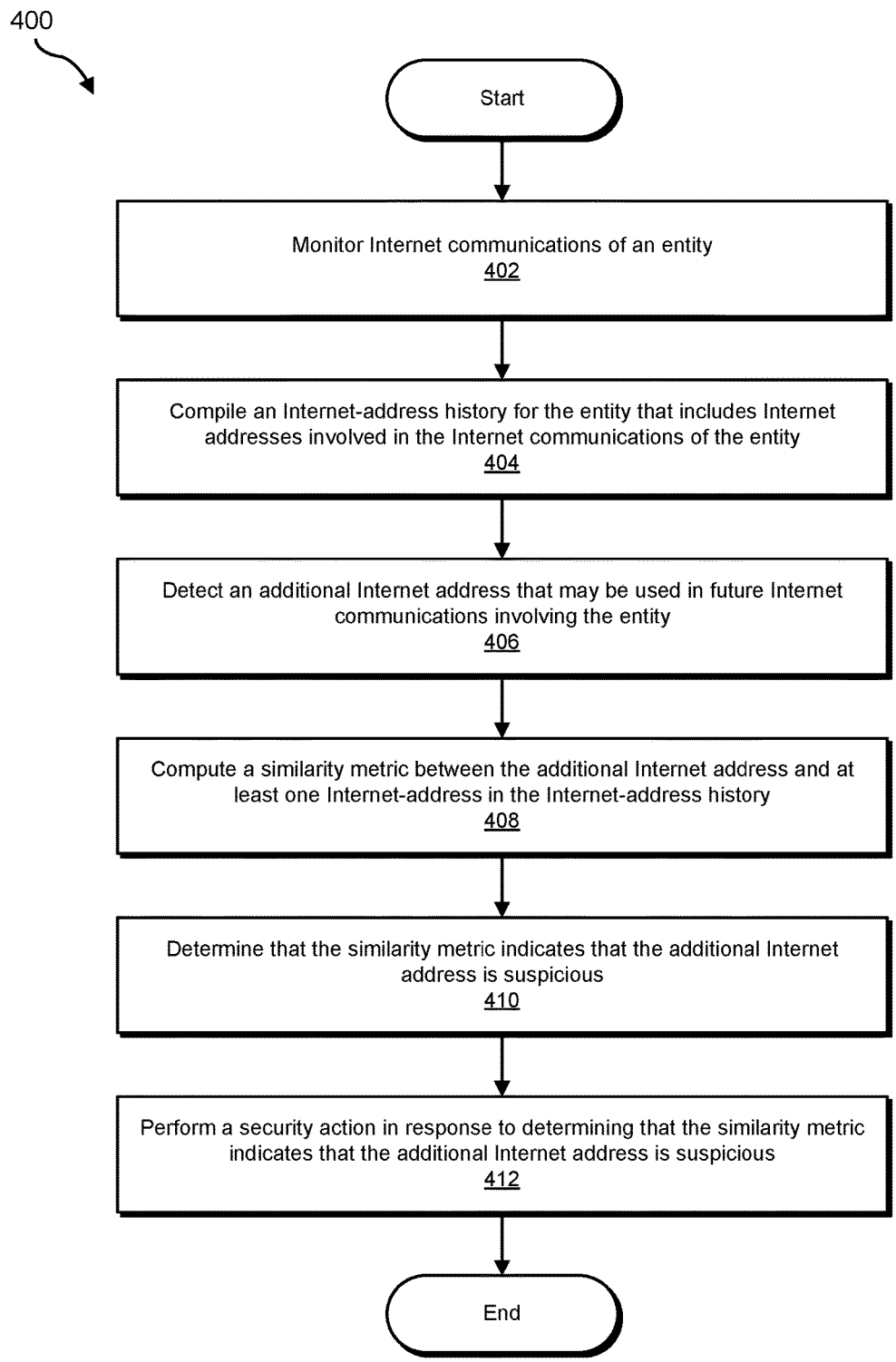
FIG. 4 is a flow diagram of an exemplary method for detecting suspicious Internet addresses.

FIG. 4 is a flow diagram of an exemplary computer-implemented method 400 for detecting suspicious Internet addresses. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 610 in FIG. 6, and/or portions of exemplary network architecture 700 in FIG. 7.

As illustrated in FIG. 4, at step 402 one or more of the systems described herein may monitor Internet communications of an entity. For example, monitoring module 104 may, as part of computing device 202 in FIG. 2, monitor Internet communications 208.

As used herein, the term "entity" generally refers to any organization (e.g., a business or government unit), individual, group of related individuals, department within an organization, computing device, collection of computing devices, or computing system whose Internet communications may be separated from or distinguished from those of another entity. In some examples, the term "entity" may refer to a single organization, a single individual, or a single computing device. In some examples, the term "entity" may refer to any organization, individual, group of related individuals, or department within an organization that may be the target of an advanced persistent threat such as a spear-phishing attack. Additionally or alternatively, the term "entity" may refer to any computing device or system that may be infected by malware (e.g., a computing device that has become part of a bot network).

As will be explained in greater detail below, by tracking the Internet addresses involved in the Internet communications of a particular entity, the systems and methods described herein may detect newly encountered Internet addresses that are suspiciously similar to and/or may be mistaken for Internet addresses previously encountered in the Internet communications of the entity and may, as a result, be part of a targeted attack on the entity. Furthermore, by detecting newly encountered Internet addresses that are similar to Internet addresses previously encountered in the Internet communications transmitted from a computing system, the systems and methods disclosed herein may determine that the newly encountered Internet addresses were generated using a domain-fluxing algorithm by a bot network that has infected the computing system.

The term "Internet communication," as used herein, generally refers to any transfer of data between two computing devices, especially any transfer of data between two computing devices via the Internet. Using FIG. 2 as an example, the term "Internet communication" may refer to data transferred between computing device 202 and one or more of third-party servers 206(1)-(N) via network 204. Using FIG. 3 as an additional example, the term "Internet communication" may refer to data transferred between computing device 302, proxy 304, communication server 306, or history server 308 and one or more of third-party servers 310(1)-(N) via network 312. Examples of Internet communications include, without limitation, hypertext transfer protocol (HTTP) communications, email communications, and/or Domain Name System (DNS) communications.

Returning to FIG. 4, monitoring module 104 may monitor Internet communications in a variety of contexts. For example, monitoring module 104 may monitor the HTTP communications of an entity as part of a web proxy, a transparent network proxy, a firewall, a router, a switch, an intrusion detection or intrusion prevention system, and/or a web filtering system. In some examples, monitoring module 104 may monitor email communications as part of an email server and/or may monitor DNS queries as part of a DNS server. In at least one example, monitoring module 104 may monitor the Internet communications of an entity as part of a computing device (e.g., a desktop, laptop, smartphone, or tablet) at which the Internet communications are received, viewed, transmitted, or generated.

Additionally or alternatively, monitoring module 104 may monitor the Internet communications of an entity by receiving information about the Internet communications from the computing devices that receive, transmit, and/or facilitate the Internet communications. For example, monitoring module 104 may monitor the Internet communications of an entity by receiving logs from web proxies, email systems, DNS servers, transparent network proxies, and/or any other source of the entity's Internet communications.

Monitoring module 104 may monitor all or a portion of the Internet communications of an entity. For example, monitoring module 104 may monitor the inbound Internet communications received by an entity and/or the outbound Internet communications that are transmitted by the entity.

At step 404, one or more of the systems described herein may compile an Internet-address history for an entity that includes Internet addresses involved in the Internet communications of the entity. For example, compiling module 106 may, as part of computing device 202 in FIG. 2, compile Internet-address history 212 that includes Internet addresses 210 involved in Internet communications 208.

The term "Internet-address history," as used herein generally refers to a database of one or more Internet addresses involved in the Internet communications of a single entity. As used herein, the term "Internet address" generally refers to any combination of characters that is used to identify the source or destination of an Internet communication. Examples of Internet addresses include, without limitation, email addresses, domain names (e.g., fully qualified domain names), and uniform resource locators.

In some examples, an attacker may impersonate a trusted entity by using an Internet address that is similar to and that may be mistaken for the trusted entity's Internet address. By impersonating a trusted entity, an attacker may entice an individual to open malicious email attachments, visit malicious web pages that may exploit vulnerabilities in web browser software, or enter sensitive information (e.g., account credentials) into a malicious website that imitates the look and feel of a trusted website. In other examples, a bot network may use a domain-fluxing algorithm to generate many similar Internet addresses with which the bot network may communicate with a command and control server.

Figure 5:
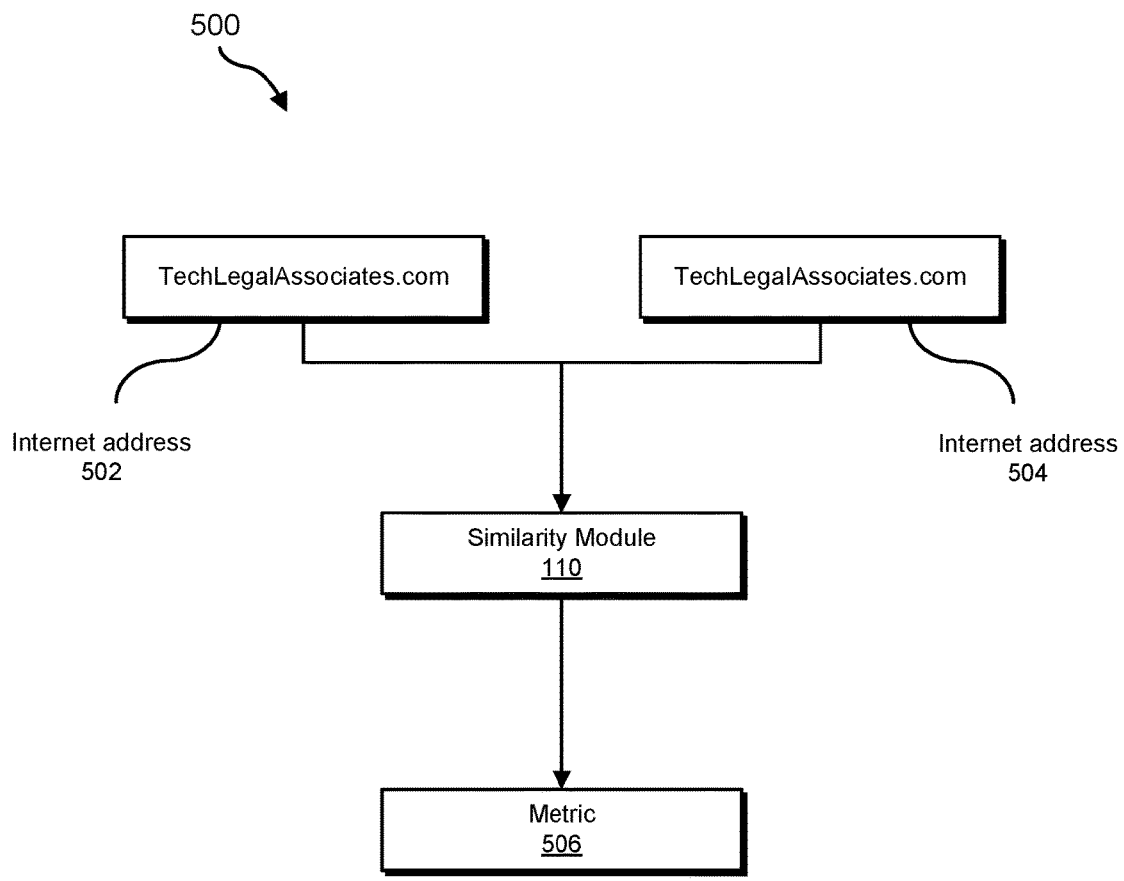
FIG. 5 is a diagram of an exemplary data flow for detecting suspicious Internet addresses.

FIG. 5 illustrates two exemplary Internet addresses. As shown in FIG. 5, Internet address 502 represents the domain name "TechLegalAssociates.com" and Internet address 504 represents the domain name "TechLegalAssociates.com." In this example, Internet addresses 502 and 504 are spelled differently. For example, the term "Legal" in Internet address 502 is spelled L-E-G-A-L, while the term "Legal" in Internet address 504 is spelled L-E-G-A-I. In the examples that follow, Internet address 502 may represent the domain name of a law firm with which an organization frequently communicates, while Internet address 504 may represent a malicious domain name that was registered for use in a targeted attack on the organization.

Returning to FIG. 4, compiling module 106 may compile an Internet-address history for an entity in any suitable manner. In one example, compiling module 106 may compile an Internet-address history for an entity by adding, to the entity's Internet-address history, the source and/or destination Internet addresses of the entity's Internet communications identified in step 402. For example, compiling module 106 may add, to an entity's Internet-address history, the email addresses of the senders and/or recipients of any email communications identified in step 402. In another example, compiling module 106 may add, to an entity's Internet-address history, the source or destination domain names or URLs of any HTTP communications identified in step 402.

Additionally or alternatively, compiling module 106 may compile an Internet-address history for an entity by adding, to the entity's Internet-address history, any Internet addresses that were contained in the entity's Internet communications. For example, compiling module 106 may add, to an entity's Internet-address history, any email addresses, domain names, and/or URLs found within email communications, HTTP communications, or DNS communications identified in step 402.

Compiling module 106 may add all or a portion of the Internet addresses involved in the Internet communications of an entity to the entity's Internet-address history. For example, compiling module 106 may add only the Internet addresses involved in inbound Internet communications received by an entity to the entity's Internet-address history.

In some examples, compiling module 106 may include within an entity's Internet-address history additional information about the Internet addresses contained therein. For example, compiling module 106 may include within an entity's Internet-address history information that indicates whether and/or how frequently an Internet address has been involved in inbound Internet communications of the entity and whether and/or how frequently an Internet address has been involved in outbound Internet communications of the entity. As explained below, the systems and methods disclosed herein may use this additional information when determining whether a newly encountered Internet address is suspicious.

At step 406, one or more of the systems described herein may detect an additional Internet address that may be used in future Internet communications involving the entity. For example, detecting module 108 may, as part of computing device 202 in FIG. 2, detect Internet address 214 after Internet-address history 212 is compiled.

Detecting module 108 may detect Internet addresses that may be used in future Internet communications involving an entity in any suitable manner. In at least one example, detecting module 108 may detect Internet addresses that may be used in future Internet communications involving an entity as part of monitoring the Internet communications of the entity (e.g., as described above in connection with step 402). For example, detecting module 108 may detect a previously unencountered email address, domain name, or URL that may be used in future Internet communications involving an entity by monitoring the email, HTTP, and/or DNS communications of the entity.

Additionally or alternatively, detecting module 108 may detect Internet addresses that may be used in future Internet communications involving an entity by monitoring attempts by the entity to use previously unencountered Internet addresses. For example, detecting module 108 may detect when an individual or computing device attempts to transmit an Internet communication to a previously unencountered email address, domain name, or URL.

In some examples, detecting module 108 may detect Internet addresses that may be used in future Internet communications involving an entity by receiving the Internet addresses from the entity. For example, detecting module 108 may receive an Internet address from an entity as part of a request by the entity for security or reputation information associated with the Internet address. In another example, detecting module 108 may receive an Internet address from an entity when the entity enters the Internet address into an Internet-address field (e.g., a recipient field of an email client or an address field of a web browser).

At step 408, one or more of the systems described herein may compute a similarity metric between the additional Internet address and at least one Internet-address in the Internet-address history. For example, similarity module 110 may, as part of computing device 202 in FIG. 2, compute similarity metric 216 between Internet address 214 and at least one Internet-address in Internet-address history 212.

Similarity module 110 may compute a similarity metric between two Internet addresses in any suitable manner. In general, similarity module 110 may compute a similarity metric between two Internet addresses using a suitable algorithm (e.g., a string or pattern matching algorithm) whose output may indicate how closely the two Internet addresses match, the likelihood that a user may mistake one of the Internet addresses for the other, and/or the likelihood that the two Internet addresses have been generated using a domain-fluxing algorithm. In some examples, similarity module 110 may compute a similarity metric between two Internet addresses by dividing each Internet address into a sequence or set of its component parts (e.g., component phonemes, syllables, letters, words, or n-grams) and by computing a similarity metric between the sequences or sets of component parts of the two Internet addresses.

In at least one example, similarity module 110 may compute a lexical distance (e.g., a Levenshtein distance) between two Internet addresses using a suitable distance function (e.g., an edit-distance function or a token-based distance function). Using FIG. 5 as an example, similarity module 110 may compute a metric 506 (e.g., a similarity or lexical distance metric) between Internet address 502 and Internet address 504 that indicates that Internet address 504 closely matches Internet address 502 due to the fact that only one character differs between Internet address 504 and Internet address 502.

Returning to FIG. 4, similarity module 110 may compute a similarity metric between two Internet addresses that indicates that the two Internet addresses are confusingly or deceptively similar based on determining that a user is likely to mistake one Internet address for the other. In one example, similarity module 110 may determine that a user is likely to mistake one Internet address for another by determining that a difference between the two Internet addresses is attributable to a substitution of one character for a visually similar or often confused character (e.g., a substitution of the letter "l" (lowercase L) for the letter "I" (uppercase i)).

Additionally or alternatively, similarity module 110 may determine that a user is likely to mistake one Internet address for another by determining that a difference between the two Internet addresses is attributable to a substitution of one Unicode symbol for another visually similar or often confused Unicode symbol (e.g., a visually similar Unicode symbol from a different symbol set). In at least one example, similarity module 110 may determine that a user is likely to mistake one Internet address for another by determining that a difference between the two Internet addresses is attributable to a substitution of one syllable for a phonetically similar syllable.

In some examples, similarity module 110 may determine that a user is likely to mistake one Internet address for another by determining that an Optical Character Recognition (OCR) system mistakes one Internet address for another. In one example, similarity module 110 may determine that an OCR system mistakes one Internet address for another by (1) converting each Internet address into a visual representation, (2) converting the visual representation of each Internet address into a sequence of computer-readable characters using the OCR system, and (3) determining that the sequences of computer-readable characters of the two Internet addresses are the same or similar.

In some examples, similarity module 110 may limit the number of Internet addresses within an Internet-address history to which a newly encountered Internet address is compared. For example, similarity module 110 may compute a similarity metric between a newly encountered Internet address and only those Internet-addresses in an Internet-address history that are frequently used in an entity's Internet communications. In another example, similarity module 110 may compute a similarity metric between a newly encountered Internet address and only those Internet-addresses in an Internet-address history that were involved in inbound Internet communications.

At step 410, one or more of the systems described herein may determine that the similarity metric indicates that the additional Internet address is suspicious. For example, determining module 112 may, as part of computing device 202 in FIG. 2, determine that similarity metric 216 indicates that Internet address 214 is suspicious.

Determining module 112 may determine that a similarity metric indicates that a newly encountered Internet address is suspicious in any suitable manner. In general, determining module 112 may consider a newly encountered Internet address to be suspicious if a similarity metric indicates that the Internet address closely matches and/or may be mistaken for an Internet address in an entity's Internet-address history. In some examples, determining module 112 may consider a newly encountered Internet address to be suspicious only if a similarity metric computed between the Internet address and an Internet address in an entity's Internet-address history is greater than a predetermine threshold. In at least one example, determining module 112 may consider a newly encountered Internet address to be suspicious only if a lexical distance computed between the Internet address and an Internet address in an entity's Internet-address history is less than a predetermine threshold.

In some examples, determining module 112 may determine that a newly encountered Internet address is suspicious due to the fact that a similarity metric that indicates that a newly encountered Internet address closely matches an Internet address in an entity's Internet-address history may indicate that the Internet address is part of a targeted attack on the entity and/or that the Internet address has been generated by a domain-fluxing algorithm.

In some examples, determining module 112 may use certain attributes of a newly encountered Internet address and/or the Internet address in an entity's Internet-address history to which the newly encountered Internet address is similar to determine the suspiciousness of the newly encountered Internet address, the likelihood that the newly encountered Internet address is part of a targeted attack on the entity, and/or the likelihood that that the newly encountered Internet address has been generated by a domain-fluxing algorithm. For example, determining module 112 may use DNS information and/or registration information (e.g., WHOIS information such as a date of registration) associated with a newly encountered Internet address and the Internet address to which the newly encountered Internet address is similar to determine the suspiciousness of the newly encountered Internet address. In one example, determining module 112 may determine that a newly encountered Internet address is not suspicious if its registration information matches or is similar to that of the Internet address to which the newly encountered Internet address is similar. Likewise, determining module 112 may determine that a newly encountered Internet address is suspicious if its registration information does not match or is dissimilar to that of the Internet address to which the newly encountered Internet address is similar.

In some situations, an attacker may be more likely to attempt to imitate an Internet address with which an entity often exchanges Internet communication than an Internet address with which an entity seldom exchanges Internet communication. As such, determining module 112 may consider a newly encountered Internet address that closely matches an Internet address with which an entity often exchanges Internet communications to be more likely a part of a targeted attack than a newly encountered Internet address that closely matches an Internet address with which the entity seldom exchanges Internet communications.

In some situations, a bot network may use a domain-fluxing algorithm to generate many similar Internet addresses with which the bot network may communicate with a command and control server. However, the bot network may use each Internet address only as many times as necessary to determine whether the Internet address may be used to connect to the command and control server. As such, determining module 112 may consider a newly encountered Internet address that closely matches many Internet addresses in an entity's Internet-address history that are involved in less than a predetermined number of outbound Internet communications of the entity to have been generated by a bot network using a domain-fluxing algorithm.

In some examples after determining that a similarity metric indicates that a newly encountered Internet address is suspicious, determining module 112 may ensure that the newly encountered Internet address is not a legitimate Internet address by querying a database of Internet-addresses that are known or likely to be legitimate (e.g., legitimate Internet addresses 124 in FIG. 1). For example, determining module 112 may ensure that a newly encountered Internet address is not a legitimate Internet address by querying a database of Internet addresses (e.g., a cloud-based reputation service) that includes Internet addresses that are likely to be legitimate due to the fact that the Internet addresses are involved in Internet communications of a large number of entities.

Additionally or alternatively, determining module 112 may ensure that a newly encountered Internet address is not a legitimate Internet address by comparing certain attributes (such as DNS information and/or registration information) of the newly encountered Internet address with the same attributes of the Internet address in an entity's Internet-address history to which the newly encountered Internet address is similar and/or known legitimate Internet addresses. For example, determining module 112 may determine that a newly encountered Internet address is or is likely not a legitimate Internet address by determining that the newly encountered Internet address does not share a subdomain with the Internet address to which the newly encountered Internet address is similar and/or any legitimate Internet address. In another example, determining module 112 may determine that a newly encountered Internet address is or is likely not a legitimate Internet address by determining that the newly encountered Internet address does not resolve to an IP address associated with the Internet address to which the newly encountered Internet address is similar and/or any known legitimate Internet addresses.

At step 412, one or more of the systems described herein may perform a security action in response to determining that the similarity metric indicates that the additional Internet address is suspicious. For example, security module 114 may, as part of computing device 202 in FIG. 2, perform a security action in response to determining that similarity metric 216 indicates that Internet address 214 is suspicious.

The systems described herein may perform step 412 in any suitable manner. In one example, security module 114 may block any Internet communications that are received from suspicious Internet addresses, any Internet communications that are sent to suspicious Internet addresses, and/or any Internet communications that contain suspicious Internet addresses. For example, security module 114 may block emails that are received from suspicious email addresses, block emails that are sent to suspicious email addresses, and/or block emails that contain suspicious Internet addresses. Similarly, security module 114 may block HTTP communications that are received from suspicious domain names or URLs, HTTP communications that are sent to suspicious domain names or URLs, and/or HTTP communications that include suspicious Internet addresses.

Additionally or alternatively, security module 114 may warn an entity of any Internet communications that are received from suspicious Internet addresses, any Internet communications that are sent to suspicious Internet addresses, and/or any Internet communications that contain suspicious Internet addresses. For example, security module 114 may warn a user about emails received from suspicious email addresses and/or may warn the user when the user attempts to send an email to a suspicious email address. Similarly, security module 114 may warn a user when the user attempts to access a website, a web page, or file via a suspicious domain name or URL and/or may warn the user when the user attempts to transmit information to a website via a suspicious domain name or URL.

In at least one example, security module 114 may remove suspicious Internet addresses from Internet communications. For example, security module 114 may remove suspicious email addresses and/or URLs from emails and/or HTTP communications. Additionally or alternatively, security module 114 may hide suspicious Internet addresses found in Internet communications. For example, security module 114 may prevent a user from viewing suspicious email addresses and/or URLs in an email client or web browser. Upon completion of step 412, exemplary method 400 in FIG. 4 may terminate.

As explained above, by monitoring the Internet communications of a particular entity (such as an organization), the systems and methods described herein may detect newly encountered Internet addresses that are suspiciously similar to and/or may be mistaken for Internet addresses previously encountered in the Internet communications of the entity and may, as a result, be part of a targeted attack (such as a spear-phishing attack) on the entity. Furthermore, in some examples, by comparing newly encountered Internet addresses to Internet addresses that have been previously encountered in Internet communications of an entity rather than to every Internet address that is known to be legitimate, these systems and methods may detect Internet addresses that may be part of targeted attacks at high true-positive rates and low false-positive rates.

Moreover, by detecting newly encountered Internet addresses that are similar to Internet addresses previously encountered in the Internet communications transmitted from a computing system, the systems and methods disclosed herein may determine that the newly encountered Internet addresses were generated using a domain-fluxing algorithm by a bot network that has infected the computing system. In this way, the systems and methods disclosed herein may detect and/or eliminate bot networks.

In some examples, the systems and methods described herein may monitor the Internet communications of the individuals within an organization in order to compile an Internet-address history for the organization that includes the Internet addresses involved in the Internet communications of the individuals within the organization. Upon compiling the Internet-address history for the organization, the systems and methods described herein may continue to monitor the Internet communications of the individuals within the organization for new Internet addresses that are lexically close to Internet addresses contained in the organization's Internet-address history. If a new Internet address is determined to be lexically close to an Internet address contained in the organization's Internet-address history, the systems and methods described herein may consider the new Internet address to be suspicious and may block any Internet communications that are associated with the new Internet address.

Figure 6:
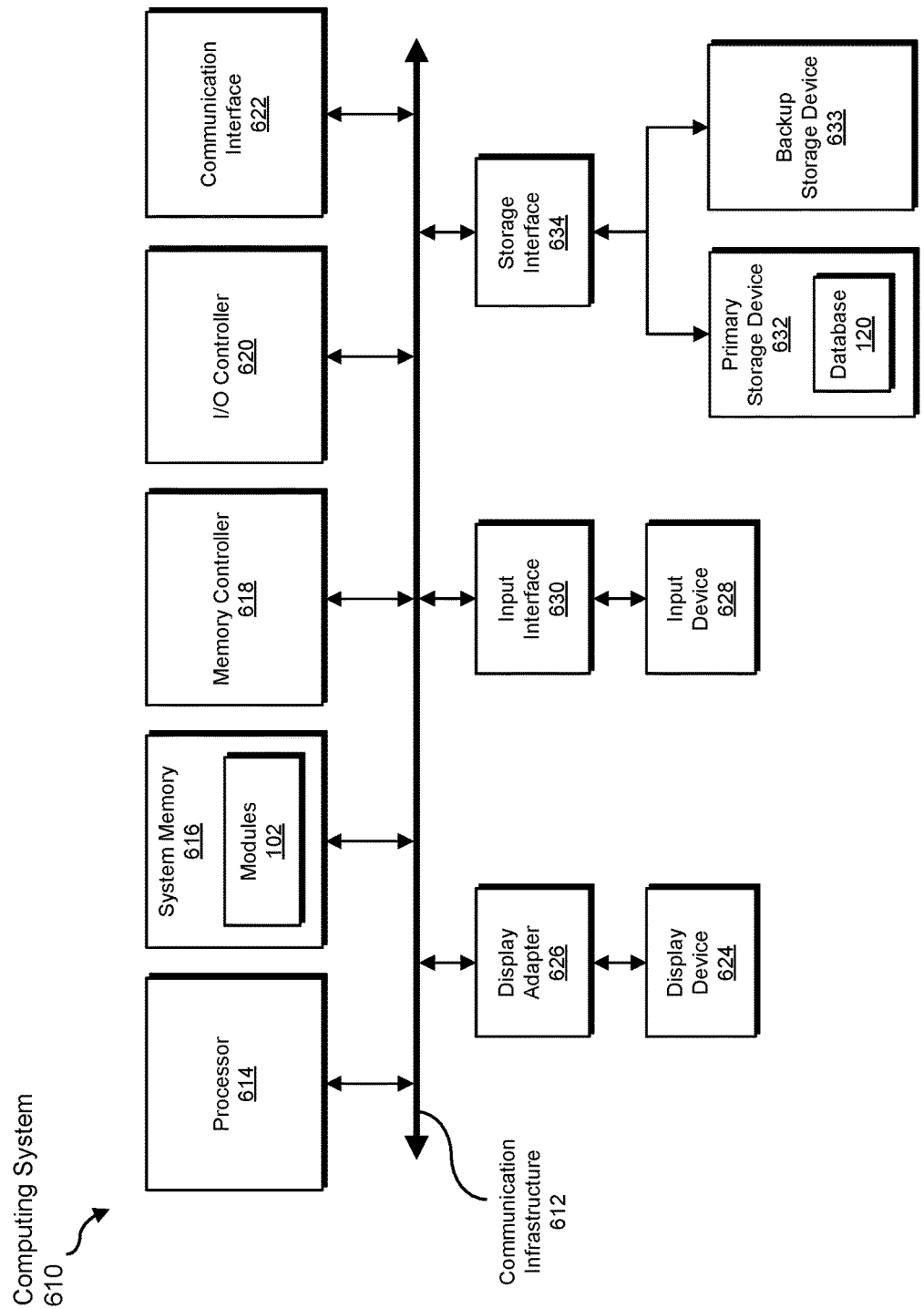
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 4). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitorytype media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
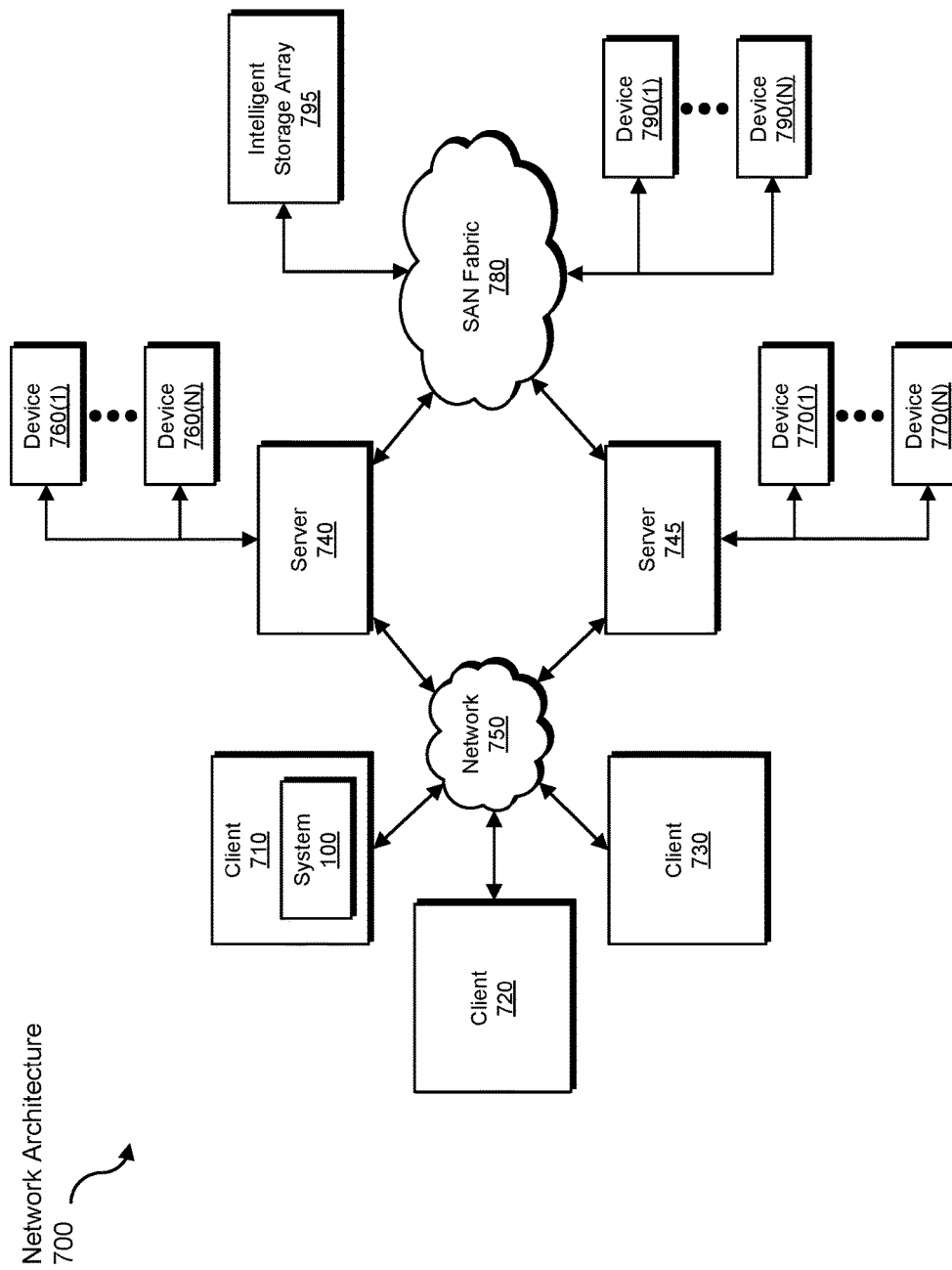
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 4). All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for detecting suspicious Internet addresses.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive one or more Internet addresses involved in Internet communications of an entity to be transformed, transform the one or more Internet addresses involved in the Internet communications of the entity into an Internet-address history for the entity, output a result of the transformation to a system that detects suspicious Internet addresses, use the result of the transformation to determine that an Internet address is suspicious, and store the result of the transformation to a storage system that stores Internet-address histories. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting suspicious Internet addresses, at least a portion of the method being performed by a computing device comprising at least one processor, the method comprising:
   monitoring Internet communications of an entity;
   compiling an Internet-address history for the entity that comprises a trusted Internet address of at least one of:
      a source of an Internet communication received by the entity; and
      a destination of an Internet communication sent by the entity; and
   after compiling the Internet-address history for the entity:
      detecting a suspicious Internet address that may be used in future Internet communications involving the entity;
      determining that a likelihood that a user would mistake the suspicious Internet address for the trusted Internet address is above a predetermined threshold; and
      performing a security action in response to determining that the likelihood that a user would mistake the suspicious Internet address for the trusted Internet address is above the predetermined threshold.

2. The computer-implemented method of claim 1, wherein determining that the likelihood that a user would mistake the suspicious Internet address for the trusted Internet address is above the predetermined threshold comprises determining that the suspicious Internet address and the Internet-address differ by only a predetermined number of characters.

3. The computer-implemented method of claim 1, wherein determining that the likelihood that a user would mistake the suspicious Internet address for the trusted Internet address is above the predetermined threshold comprises determining that the suspicious Internet address and the Internet-address differ by only a predetermined number of visually similar characters.

4. The computer-implemented method of claim 1, wherein determining that the likelihood that a user would mistake the suspicious Internet address for the trusted Internet address is above the predetermined threshold comprises determining that the suspicious Internet address and the Internet-address differ by only characters that are confused for each other at greater than a predetermined rate.

5. The computer-implemented method of claim 1, wherein determining that the likelihood that a user would mistake the suspicious Internet address for the trusted Internet address is above the predetermined threshold comprises determining that a difference between the suspicious Internet address and the Internet-address is attributable to a substitution of one syllable for a phonetically similar syllable.

6. The computer-implemented method of claim 1, wherein determining that the likelihood that a user would mistake the suspicious Internet address for the trusted Internet address is above the predetermined threshold comprises determining that an optical character recognition system mistakes the suspicious Internet address for the trusted Internet address.

7. The computer-implemented method of claim 1, wherein:
   detecting the suspicious Internet address comprises detecting the suspicious Internet address in an inbound Internet communication of the entity;
   performing the security action comprises at least one of:
      blocking the inbound Internet communication;
      informing the entity that the suspicious Internet address in the inbound Internet communication is suspicious.

8. The computer-implemented method of claim 1, wherein:
   detecting the suspicious Internet address comprises detecting an outbound Internet communication that is transmitted by the entity to the suspicious Internet address;
   performing the security action comprises at least one of:
      blocking the outbound Internet communication;
      informing the entity that the suspicious Internet address is suspicious.

9. The computer-implemented method of claim 1, wherein:
   detecting the suspicious Internet address comprises detecting an attempt by the entity to use the suspicious Internet address;
   performing the security action comprises at least one of:
      blocking the attempt by the entity to use the suspicious Internet address;
      informing the entity that the suspicious Internet address is suspicious.

10. The computer-implemented method of claim 1, wherein the suspicious Internet address and the trusted Internet address are email addresses.

11. The computer-implemented method of claim 1, wherein the suspicious Internet address and the trusted Internet address are domain names.

12. The computer-implemented method of claim 1, wherein the suspicious Internet address and the trusted Internet address are uniform resource locators.

13. A system for detecting suspicious Internet addresses, the system comprising:
   memory comprising:
      a monitoring module, stored in the memory, that monitors Internet communications of an entity;
      a compiling module, stored in the memory, that compiles an Internet-address history for the entity that comprises a trusted Internet address of at least one of:
         a source of an Internet communication received by the entity; and
         a destination of an Internet communication sent by the entity;
      a detecting module, stored in the memory, that detects, after the Internet-address history for the entity is compiled, a suspicious Internet address that may be used in future Internet communications involving the entity;
      a determining module, stored in the memory, that determines that a likelihood that a user would mistake the suspicious Internet address for the trusted Internet address is above a predetermined threshold; and a security module, stored in the memory, that performs a security action in response to the determination that the likelihood that a user would mistake the suspicious Internet address for the trusted Internet address is above the predetermined threshold; and at least one physical processor that executes the monitoring module, the compiling module, the detecting module, the determining module, and the security module.

14. The system of claim 13, wherein the determining module determines that the likelihood that a user would mistake the suspicious Internet address for the trusted Internet address is above the predetermined threshold by determining that the suspicious Internet address and the Internet-address differ by only a predetermined number of characters.

15. The system of claim 13, wherein the determining module determines that the likelihood that a user would mistake the suspicious Internet address for the trusted Internet address is above the predetermined threshold by determining that the suspicious Internet address and the Internet-address differ by only a predetermined number of visually similar characters.

16. The system of claim 13, wherein the determining module determines that the likelihood that a user would mistake the suspicious Internet address for the trusted Internet address is above the predetermined threshold by determining that the suspicious Internet address and the Internet-address differ by only characters that are confused for each other at greater than a predetermined rate.

17. The system of claim 13, wherein the determining module determines that the likelihood that a user would mistake the suspicious Internet address for the trusted Internet address is above the predetermined threshold by determining that a difference between the suspicious Internet address and the Internet-address is attributable to a substitution of one syllable for a phonetically similar syllable.

18. The system of claim 13, wherein the determining module determines that the likelihood that a user would mistake the suspicious Internet address for the trusted Internet address is above the predetermined threshold by determining that an optical character recognition system mistakes the suspicious Internet address for the trusted Internet address.

19. The system of claim 13, wherein:
the detecting module detects the suspicious Internet address by detecting the suspicious Internet address in an inbound Internet communication of the entity;
the security module performs the security action by performing at least one of:
blocking the inbound Internet communication;
informing the entity that the suspicious Internet address in the inbound Internet communication is suspicious.

20. A non-transitory computer-readable medium comprising one or more computer-executable instructions that, when executed by at least one processor of a computing device, cause the computing device to:
monitor Internet communications of an entity;
compile an Internet-address history for the entity that comprises a trusted Internet address of at least one of:
a source of an Internet communication received by the entity; and
a destination of an Internet communication sent by the entity; and
after the Internet-address history for the entity is compiled:
detect a suspicious Internet address that may be used in future Internet communications involving the entity;
determine that a likelihood that a user would mistake the suspicious Internet address for the trusted Internet address is above a predetermined threshold; and
perform a security action in response to determining that the likelihood that a user would mistake the suspicious Internet address for the trusted Internet address is above the predetermined threshold.

\* \* \* \* \*